US009112601B2

(12) United States Patent
Gao et al.

(10) Patent No.: US 9,112,601 B2
(45) Date of Patent: Aug. 18, 2015

(54) OPTICAL LINK HANDSHAKE TECHNIQUES AND CONFIGURATIONS

(75) Inventors: Miaobin Gao, Saratoga, CA (US); Christine M. Krause, Santa Cruz, CA (US); Hui-Chin Wu, Cupertino, CA (US); Hengju Cheng, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 13/976,343

(22) PCT Filed: Mar. 27, 2012

(86) PCT No.: PCT/US2012/030770
§ 371 (c)(1),
(2), (4) Date: Jun. 26, 2013

(87) PCT Pub. No.: WO2013/147754
PCT Pub. Date: Oct. 3, 2013

(65) Prior Publication Data
US 2014/0133846 A1    May 15, 2014

(51) Int. Cl.
*H04B 10/073* (2013.01)
*H04B 10/00* (2013.01)
*H04L 12/42* (2006.01)
*H04B 10/40* (2013.01)

(52) U.S. Cl.
CPC .............. *H04B 10/073* (2013.01); *H04B 10/40* (2013.01)

(58) Field of Classification Search
CPC ............. H04B 10/073; H04B 10/0799; H04B 10/2581

USPC ................................................ 398/16, 9, 140
See application file for complete search history.

(56) References Cited

U.S. PATENT DOCUMENTS

| 4,994,675 | A  | * | 2/1991  | Levin et al. ................... 250/551 |
| 5,208,513 | A  | * | 5/1993  | Murayama .................... 315/129 |
| 5,898,512 | A  | * | 4/1999  | Arai ............................... 398/30 |
| 6,438,285 | B1 | * | 8/2002  | DeCusatis et al. .............. 385/24 |
| 6,446,867 | B1 |   | 9/2002  | Sanchez |
| 6,965,722 | B1 | * | 11/2005 | Nguyen ......................... 385/147 |
| 6,980,575 | B1 | * | 12/2005 | Rohilla ....................... 372/38.02 |
| 7,062,177 | B1 | * | 6/2006  | Grivna et al. ................. 398/162 |
| 7,581,891 | B2 | * | 9/2009  | Wang .............................. 385/89 |
| 7,787,767 | B2 | * | 8/2010  | Wang .............................. 398/33 |

(Continued)

OTHER PUBLICATIONS

International Search Report and Written Opinion for PCT/US2012/030770, mailed Nov. 23, 2012, 7 pages.

(Continued)

*Primary Examiner* — Oommen Jacob
(74) *Attorney, Agent, or Firm* — Schwabe Williamson & Wyatt PC

(57) ABSTRACT

Embodiments of the present disclosure provide optical link handshake techniques and configurations. In one embodiment, an optical module includes a laser driver corresponding with a channel of the optical module, a signal detector corresponding with the channel, and a link handshake state machine configured to control the laser driver to generate a connect pulse of a link handshake process to test an optical link between the channel and a corresponding channel of another optical module and monitor the signal detector to detect a connect pulse from the another optical module. Other embodiments may be described and/or claimed.

23 Claims, 7 Drawing Sheets

(56) References Cited

U.S. PATENT DOCUMENTS

| | | | |
|---|---|---|---|
| 8,009,709 B2 * | 8/2011 | Nelson | 372/38.02 |
| 2002/0064193 A1 * | 5/2002 | Diaz et al. | 372/26 |
| 2002/0149810 A1 * | 10/2002 | Brown et al. | 359/110 |
| 2003/0095303 A1 * | 5/2003 | Cunningham et al. | 359/110 |
| 2004/0146296 A1 * | 7/2004 | Gerszberg et al. | 398/12 |
| 2005/0062543 A1 * | 3/2005 | Mayampurath et al. | 330/308 |
| 2009/0080881 A1 * | 3/2009 | Yokoyama | 398/16 |
| 2009/0087195 A1 | 4/2009 | Schwandner et al. | |
| 2009/0201052 A1 * | 8/2009 | Sanduleanu et al. | 327/108 |
| 2014/0133846 A1 * | 5/2014 | Gao et al. | 398/16 |

OTHER PUBLICATIONS

International Report and Patentability for PCT Application No. PCT/US2012/030770, dated Oct. 9, 2014, 8 pages.

* cited by examiner

OPTICAL LINK HANDSHAKE TECHNIQUES AND CONFIGURATIONS

CROSS REFERENCE TO RELATED APPLICATION

The present application is a national phase entry under 35 U.S.C. §371 of International Application No. PCT/US2012/030770, filed Mar. 27, 2012, entitled "OPTICAL LINK HANDSHAKE TECHNIQUES AND CONFIGURATIONS," which designates, among the various States, the United States of America, and the entire contents and disclosures of which are hereby incorporated by reference in their entireties.

FIELD

Embodiments of the present disclosure generally relate to the field of integrated circuits, and more particularly, to optical link handshake techniques and configurations.

BACKGROUND

Optical link handshake schemes may test an optical link between transceivers of optical modules before data communication over the optical link. Presently, optical link handshake schemes may be controlled by switches or routers that are external to and communicatively coupled with the optical modules. Laser eye safety mechanisms may also be controlled by the switches or routers. Current optical link handshake schemes may be complex having a large number of link handshake states (e.g., more than three).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure provide optical link handshake techniques and configurations. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. The term "coupled" may refer to a direct connection, an indirect connection, or an indirect communication.

As used herein, the term "module", "block", "engine" or "state machine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
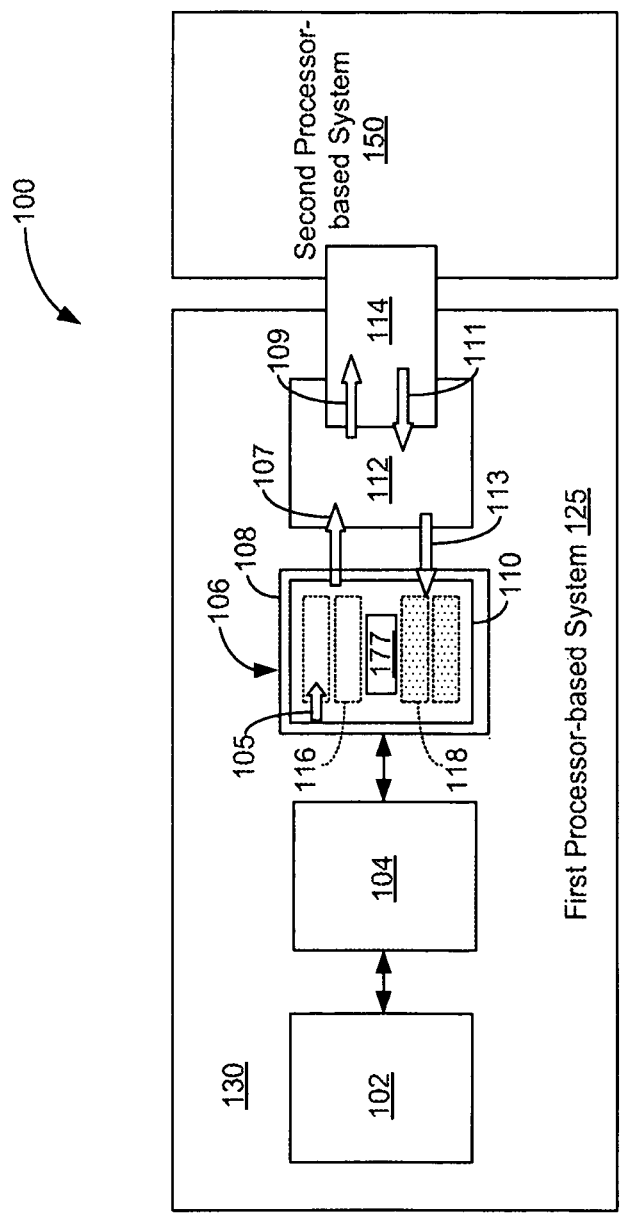
FIG. 1 schematically illustrates a top view of an example optical communication system, in accordance with some embodiments.

FIG. 1 schematically illustrates a top view of an example optical communication system 100, in accordance with some embodiments. The optical communication system may include a first processor-based system 125 and a second processor-based system 150 optically coupled together using an optical coupler 114 such as, for example, fiber(s) and/or waveguide(s) to route light in the form of "optical mode" signals, hereinafter "optical signals" (e.g., light 109, 111), between the first processor-based system 125 and the second processor-based system 150. In some embodiments, the optical coupler 114 may be an optical cable.

The first processor-based system 125 may include one or more processors (hereinafter processor 102) mounted on a substrate 130 such as, for example, a circuit board. The processor 102 may be operatively coupled with an optical module 106 to communicate with the second processor-based system 150 using optical signals (e.g., light 105, 107, 109) generated by the optical module 106 based on electrical signals received from the processor 102. For example, in some embodiments, the processor 102 may be operatively coupled with the optical module 106 via a switch and/or router device (hereinafter switch/router 104).

The switch/router 104 may be configured to receive electrical signals from the processor 102 (or other devices that may be mounted on the substrate 130) and route the electrical signals to the optical module 106 for conversion to optical signals and transmission to the second processor-based system 150. The electrical signals received by the optical module 106 may include, for example, electrical input/output (I/O) signals from the processor 102. In some embodiments, the switch/router 104 may include a multiport switch and/or functionality to support star, tree, or daisy chain network topologies. The switch/router 104 may further be configured to send information in accordance with multiple protocols over a same physical (PHY) layer to the optical module. In some embodiments, the switch/router 104 may multiplex the multiple protocols together in a physical (PHY) layer frame. The switch/router 104 may communicate with the optical module 106 using encapsulated or native protocols. In some embodiments, the switch/router 104 may include software drivers for the encapsulated or native protocols. The switch/router 104 may further be configured to provide packet formation with Quality of Service (QoS) and/or provide time synchronization, which may include, low latency and accurate synchronization to support professional audio or video applications.

The optical module 106 may be configured to receive the electrical signals from the switch/router 104 and convert the electrical signals into corresponding optical signals (e.g., light 105, 107, 109) for transmission of the optical signals to another device configured to receive the optical signals (e.g., second processor-based system 150). The optical module 106 may be further configured to receive and convert optical signals (e.g., light 111, 113) received over the optical coupler 114 from the second processor-based system 150 into electrical signals for routing to the processor 102.

The optical module 106 may further include a link handshake state machine (LHSM) 177 that is configured to perform a link handshake process to test an optical link between one or more channels of the optical module 106 and a corresponding optical module (e.g., of the second processor-based system 150). The LHSM 177 may comport with other embodiments described herein.

In some embodiments, the optical module 106 may include an opto-electronic assembly such as, for example, a first die 108 mounted on the substrate 130 and a second die 110 communicatively coupled with the first die 108. The first die 108 may represent, for example, a photonic die comprising a planar lightwave circuit (PLC) and/or a transceiver (Tx/Rx) die configured with optical components such as one or more laser drivers (e.g., laser driver 116) and one or more receivers (e.g., receiver 118) corresponding with one or more channels of an optical link. The first die 108 may further include modulators, splitters, gratings, and the like (not shown). The second die 110 may be a light-source die, which may be referred to as a "laser die" in some embodiments, and may include a light source such as one or more lasers to generate light (e.g., light 105, 107, 109) for optical signaling. The second die 110 may include any type of chip suitable for producing optical signals.

In some embodiments, the second die 110 may be mounted on the first die 108 (e.g., in a flip-chip configuration) as depicted. The laser driver 116 and the receiver 118 are depicted in dashed form to indicate that they are disposed under the second die 110 in the illustrated embodiment. In other embodiments, the first die 108 and the second die 110 may be mounted on the substrate 130. Although the first die 108 is depicted as larger than the second die 110 in FIG. 1 for the sake of clarity, the dies 108, 110 may have different relative sizes in other embodiments. In some embodiments, the die of the first die 108 or second die 110 that includes the light source (e.g., lasers) is optically coupled with the connector element 112 and/or the optical coupler 114. The connector element 112 may be mounted on the die having the light source. In some embodiments, the LHSM 177 and associated circuitry may be part of the first die 108 and/or the second die 110. The LHSM 177 may be embodied in other components of the optical module 106 in other embodiments.

The optical module 106 may include opto-electronic assemblies having other configurations in other embodiments. For example, components of the optical module 106 may be mounted on the substrate 130 in some embodiments. In other embodiments, components of the optical module 106 may be mounted on the processor 102 or components of the optical module 106 may be formed as part of the processor 102. In some embodiments, the switch/router 104 and the optical module 106 may be embodied in separate dies that are mounted on the substrate 130. In some embodiments, the switch/router 104 may be embodied in a same die as the processor 102. According to various embodiments, the optical module 106 may comport with other embodiments described herein (e.g., optical module 106 of FIGS. 2-5).

In some embodiments, the processor 102 may be configured to control one or more laser drivers (e.g., laser driver 116) of the optical module 106 to generate optical signals using light from the light-source die. The light 107 may be output from the optical module 106 to a connector element 112. The connector element 112 may include, for example, an optical plug or other coupler that further routes the light 109 from the optical module 106 over the optical coupler 114 to the second processor-based system 150.

In some embodiments, the second processor-based system 150 is configured to send light 111 over the optical coupler 114 to the first processor-based system 125. Although not shown, the second processor-based system 150 may be similarly equipped as the first processor-based system 125 or otherwise comport with embodiments described in connection the first processor-based system 125. The light 111 sent by the second processor-based system 150 may be received by the connector element 112 of the first processor-based system 125. The connector element 112 may route the light 113 to one or more receivers (e.g., receiver 118) of the optical module 106. The optical module 106 may be configured to generate electrical signals based on the light 113 received at the receiver 118 and route the electrical signals to the processor 102 (e.g., via the switch/router 104). The processor 102 may be configured to process the electrical signals received from the optical module 106.

The first processor-based system 125 and/or the second processor-based system 150 may include additional components in some embodiments. For example, the first processor-based system 125 and/or the second processor-based system 150 may comport with embodiments described in connection with the example processor-based system 1100 of FIG. 11. In other embodiments, techniques and configurations described herein for the optical link handshake can be used in other systems that benefit from the principles described herein such as, for example, optical cables, optical links, optical sensors, network hubs, routers, optical backplanes, intra-chip optical links and the like.

Figure 2:
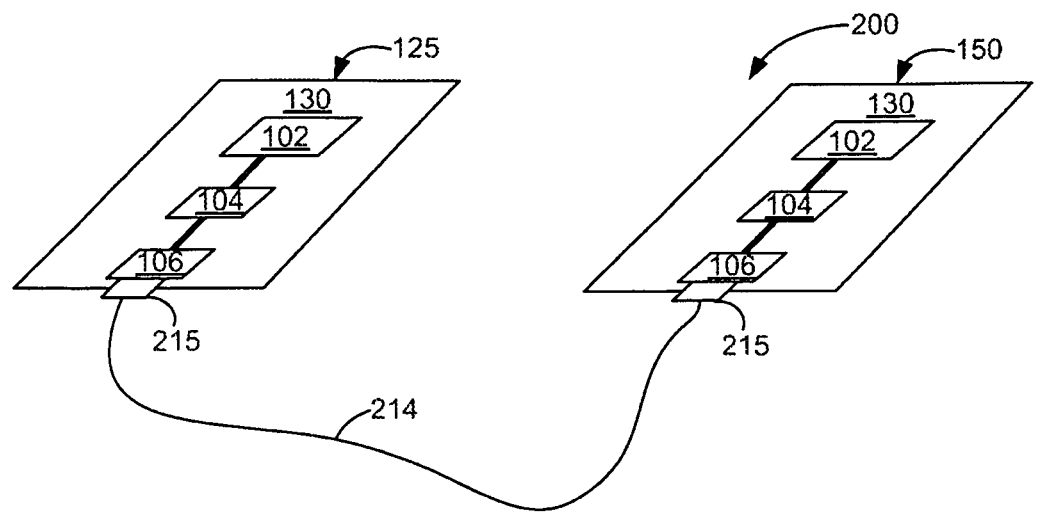
FIG. 2 schematically illustrates an example configuration of an optical communication system, in accordance with some embodiments.

FIG. 2 schematically illustrates an example configuration of an optical communication system 200, in accordance with some embodiments. In the optical communication system 200, a first processor-based system 125 includes a processor 102, switch/router 104, and optical module 106 mounted on a substrate 130. The processor 102 may be communicatively coupled with the switch/router 104, as depicted by the line between the processor 102 and switch/router 104. The switch/router 104 may be communicatively coupled with the optical module 106, as depicted by the line between the switch/router 104 and the optical module 106. The optical communication system 200 may further include a second processor-based system 150 having a similarly configured processor 102, switch/router 104, and optical module 106 mounted on a substrate 130, as can be seen.

The first processor-based system 125 may be optically coupled with the second processor-based system 150 using a passive optical cable 214 and passive optical connectors 215 to optically couple the passive optical cable 214 with the optical module 106 mounted on the substrate 130 of the respective first processor-based system 125 and second processor-based system 150. The passive optical connectors 215 may be optically coupled with each optical module 106 of the respective first processor-based system 125 and second processor-based system 150 to route optical signals between the first processor-based system 125 and second processor-based system 150.

According to various embodiments, the switch/router 104 of the first processor-based system 125 or second processor-based system 150 may be configured to communicate with the optical module 106 of the respective first processor-based system 125 or second processor-based system 150 using encapsulated or native protocols. In some embodiments, the switch/router 104 may be configured to place the encapsulated protocols in a new frame structure on a physical (PHY) layer. The encapsulated protocols may include, for example, protocols that are in accordance with specifications or other standards for Peripheral Component Interconnect Express (PCIe), DisplayPort, High-Definition Multimedia Interface (HDMI), Serial Advanced Technology Attachment (SATA), Universal Serial Bus (USB), and/or Ethernet technologies. In some embodiments, the native protocols may include, for example, protocols that are in accordance with specifications or other standards for PCIe Gen 1/2/3, QuickPath Interconnect (QPI), Thunderbolt, Infiniband, USB 3.0, HDMI, SATA, and/or Ethernet technologies. The encapsulated and native protocols may include other protocols in other embodiments.

Figure 3:
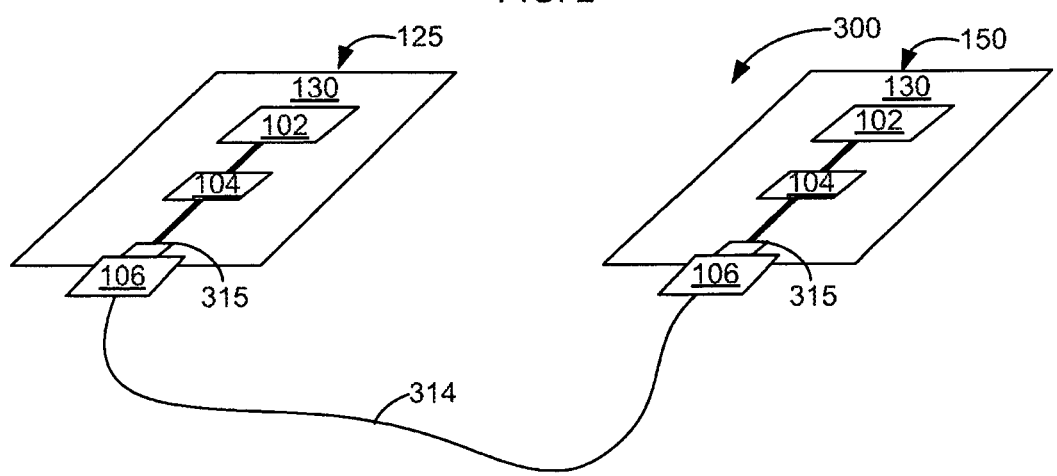
FIG. 3 schematically illustrates another example configuration of an optical communication system, in accordance with some embodiments.

FIG. 3 schematically illustrates another example configuration of an optical communication system 300, in accordance with some embodiments. In the optical communication system 300, a first processor-based system 125 may includes a processor 102 and switch/router 104 mounted on a substrate 130. The processor 102 may be communicatively coupled with the switch/router 104, as depicted by the line between the processor 102 and switch/router 104. The first processor-based system 125 may further include an electrical connector 315 physically coupled (e.g., permanently attached) to the substrate 130. The switch/router 104 may be communicatively coupled with the electrical connector 315, as depicted by the line between the switch/router 104 and the electrical connector 315. The optical communication system 300 may further include a second processor-based system 150 having a similarly configured processor 102, switch/router 104, and electrical connector 315 coupled with the substrate 130, as can be seen.

The first processor-based system 125 may be optically coupled with the second processor-based system 150 using an active optical cable 314 having an optical module 106 at ends of the optical cable 314. That is, an optical module 106 corresponding with the respective first processor-based system 125 and second processor-based system 150 may be embedded in the active optical cable 314. The optical module 106 at each end of the active optical cable 314 may be configured to electrically couple with the electrical connector 315 of the respective first processor-based system 125 and second processor-based system 150.

According to various embodiments, the switch/router 104 of the first processor-based system 125 or second processor-based system 150 may be configured to communicate with the optical module 106 that is electrically coupled with the electrical connector 315 of the respective first processor-based system 125 or second processor-based system 150 using encapsulated or native protocols. The encapsulated or native protocols may comport with embodiments described in connection with the optical communication system 200 of FIG. 2.

Figure 4:
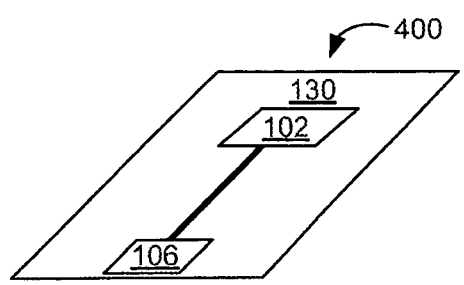
FIG. 4 schematically illustrates an example configuration of a processor-based system, in accordance with some embodiments.

FIG. 4 schematically illustrates an example configuration of a processor-based system 400 (e.g., the processor-based system 125 or 150 of FIGS. 1-3), in accordance with some embodiments. The processor-based system 400 may include a processor 102 mounted on a substrate 130. A switch, network controller, or other functionality of the switch/router 104 of FIGS. 1-3 may be embedded in a same die as the processor 102. The processor 102 may be communicatively coupled with the optical module, as depicted by the line between the processor 102 and the optical module 106. In some embodiments, the processor 102 may be configured to communicate with the optical module 106 using native protocols supported by the optical module 106. The native protocols may comport with embodiments described in connection with the optical communication system 200 of FIG. 2.

In some embodiments, techniques and configurations described in connection with FIGS. 1-4 may be combined. For example, the processor-based system 400 may be used in place of one or both of the first processor-based system 125 and the second processor-based system 150 of FIGS. 1-3. For another example, the processor-based system 400 may include an electrical connector 315 as described in connection with FIG. 3 and the optical module 106 of FIG. 4 may be embedded in an active Optical cable 314 as described in connection with FIG. 3. Other suitable combinations of features may be used in other embodiments.

Figure 5:
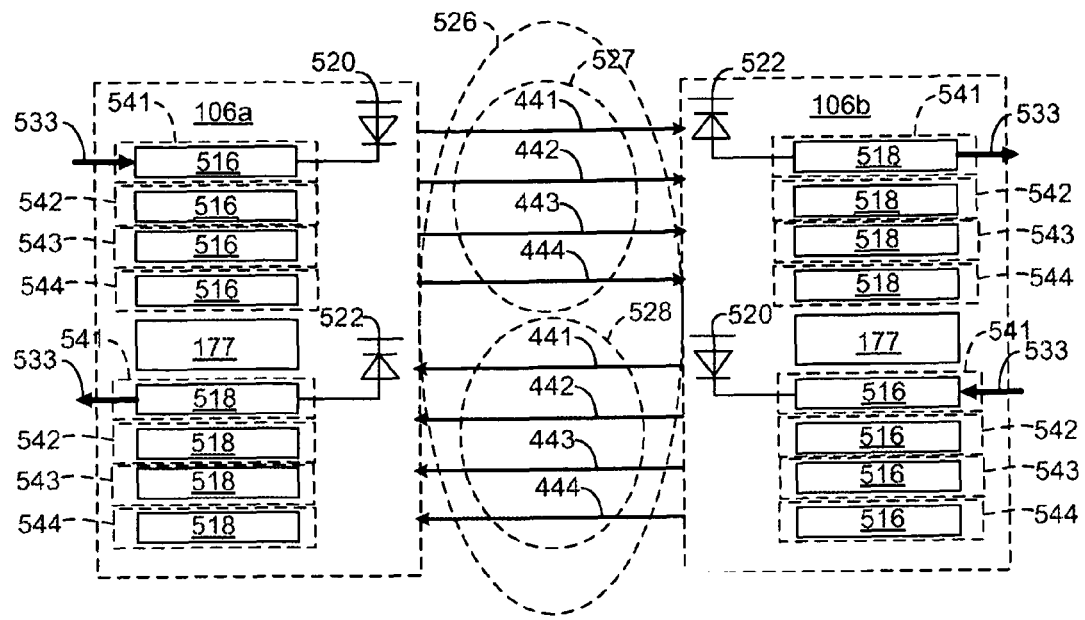
FIG. 5 schematically illustrates an example optical link between a first optical module and a second optical module, in accordance with some embodiments.

FIG. 5 schematically illustrates an example optical link 526 between a first optical module 106a and a second optical module 106b, in accordance with some embodiments. The first optical module 106a and/or the second optical module 106b may comport with embodiments described in connection with optical module 106 of FIGS. 1-4.

The first optical module 106a and the second optical module 106b may include one or more laser drivers (hereinafter "laser drivers 516"). Each of the laser drivers 516 may correspond with a channel of the respective first optical module 106a and the second optical module 106b. For example, in the first optical module 106a and the second optical module 106b, an individual laser driver of the laser drivers 516 may correspond to each of a first channel 541, a second channel 542, a third channel 543, and a fourth channel 544. The optical modules 106a, 106b may include more or fewer channels than depicted in other embodiments. For example, in some embodiments, the optical modules 106a, 106b may include 10 channels. A laser (e.g., laser 520) may be coupled to each of the laser drivers 516. Although only a single laser (e.g., laser 520) is depicted in FIG. 5 for the sake of clarity, other lasers may be similarly coupled with each of the laser drivers 516. The laser drivers 516 may be configured to drive the corresponding lasers to generate light for optical signals.

The first optical module 106a and the second optical module 106b may each further include one or more receivers (hereinafter "receivers 518"). A photodetector (e.g., photodetector 522) may be coupled to each of the receivers 518.

Although only one photodetector (e.g., photodetector 522) is depicted in FIG. 5 for the sake of clarity, other photodetectors may be similarly coupled with each of the receivers 518.

Each of the receivers 518 may correspond with a channel of the respective first optical module 106a and the second optical module 106b. For example, receivers 518 corresponding to the first channel 541, the second channel 542, the third channel 543, and the fourth channel 544 of the second optical module 106b may be configured to receive optical signals transmitted over corresponding individual links 441, 442, 443, 444 of the optical link 526 from corresponding laser drivers 516 of the first optical module 106a. Similarly, receivers 518 corresponding to the first channel 541, the second channel 542, the third channel 543, and the fourth channel 544 of the first optical module 106a may be configured to receive optical signals transmitted over corresponding individual links 441, 442, 443, 444 of the optical link 526 from corresponding laser drivers 516 of the second optical module 106b.

Accordingly, in some embodiments, each channel (e.g., first channel 541) of the first optical module 106a and the second optical module 106b may include an optical transmission path and an optical reception path (e.g., individual links 441 being the optical transmission path and optical reception path for the first channel 541). The optical link 526 may include a first plurality of individual links 527 (e.g., including individual links 441, 442, 443, 444, as can be seen) corresponding to a plurality of channels (e.g., channels 541, 542, 543, 544) for the transmission of optical signals from the first optical module 106a to the second optical module 106b and a second plurality of individual links 528 (e.g., including individual links 441, 442, 443, 444, as can be seen) corresponding to a plurality of channels (e.g., channels 541, 542, 543, 544) for the transmission of optical signals from the second optical module 106b to the first optical module 106a.

Data signals 533 received (e.g., from switch/router 104 of FIG. 1) by a laser driver of the laser drivers 516 for a particular channel (e.g., the first channel 541) can be transmitted over a corresponding individual link (e.g., the individual link 541 for the first channel 541) to a receiver of the receivers 518 for the particular channel (e.g., the first channel 541) and output, as can be seen. The data signals may have data rates of 10 gigabytes/second or more (e.g., 25 gigabytes/second). The data signals 533 may have lower data rates in some embodiments.

In some embodiments, the first optical module 106a and the second optical module 106b may each include a LHSM 177. The LHSM 177 of the first or second optical module 106a or 106b may be configured to control a laser driver of the laser drivers 516 to generate a connect pulse (e.g., three connect pulses) of a link handshake process to test the optical link 526 between a channel (e.g., first channel 541) of the first optical module 106a and a corresponding channel (e.g., first channel 541) of the second optical module 106b. The LHSM 177 of the first or second optical module 106a or 106b may be further configured to monitor a receiver of the receivers 518 to detect a connect pulse (e.g., three connect pulses) sent over the optical link 526 to further test the optical link 526 of the channel and the corresponding channel. The LHSM 177 may be embodied on a same die as the laser drivers 516 and/or receivers 518 of the first optical module 106a or the second optical module 106b, according to various embodiments. The LHSM 177 may be configured to perform actions further described in connection with FIGS. 8-10.

Figure 6:
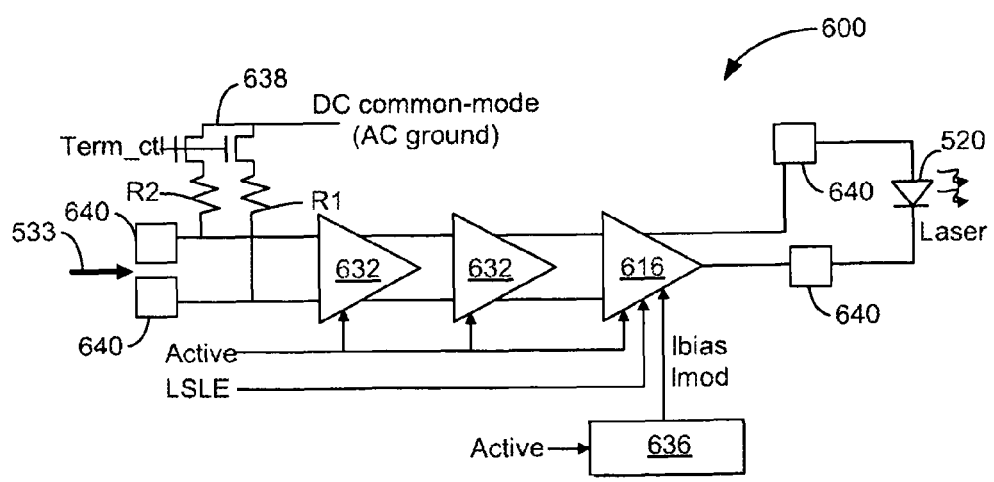
FIG. 6 schematically illustrates an example laser driver configuration, in accordance with some embodiments.

FIG. 6 schematically illustrates an example laser driver configuration 600, in accordance with some embodiments.

The laser driver configuration 600 may represent, for example, a laser driver of the laser drivers 516 of FIG. 5 or the laser driver 116 of FIG. 1.

The laser driver configuration 600 may include a laser driver 616. A laser 520 may be coupled with the laser driver 616. The laser 520 may comport with embodiments described in connection with the laser 520 of FIG. 5. In some embodiments, the laser 520 may be electrically coupled with the laser driver 616 via one or more interconnect structures (hereinafter "interconnect structures 640"). The interconnect structures 640 may represent, for example, bonding pads, solder bumps, or other interconnect structures that may be used to couple a die to another die or a substrate. In some embodiments, the laser 520 may be disposed on a die that is different than a die that includes the laser driver 616.

Gain stage(s) 632 may be coupled with the laser driver 616, as can be seen. The laser driver configuration 600 may include more or fewer gain stage(s) 632 than depicted in other embodiments. A generator 636 may be coupled with the laser driver 616 to provide bias and/or modulation currents (e.g., Ibias and/or Imod) for the laser 520 based on an Active signal received from the LHSM (e.g., the LHSM 177 of FIG. 5). According to various embodiments, the termination circuitry 638, gain stage(s) 632, and laser driver 616 may be embodied on a same die as the LHSM.

The laser driver 616 and gain stage(s) 632 may be directly coupled with the Active signal, as can be seen. In some embodiments, when the Active signal is high, all data pathways for each channel to the optical link (e.g., optical link 526) may be powered up and active. When the Active signal is low, the laser driver 616 may enter a standby state that consumes relatively less power than when in the active state.

The laser driver 616 may be configured to receive a Low Speed Laser Enable (LSLE) signal. The LSLE signal may be a low-pulse optical signal that may be used by the laser driver 616 to drive the laser 520 to generate connect pulses for the link handshake process.

Termination circuitry 638 may be configured at an input of the data signals 533 to the laser driver 616 via interconnect structures 640, as can be seen. The termination circuitry 638 may include, for example, resistors R1, R2 coupled with inputs to the laser driver 616, switches of termination control circuitry coupled with the resistors R1, R2, and a line coupling the switches of the termination circuitry 638 to a DC common-mode node or AC ground, as can be seen. In some embodiments, the resistors R1, R2 may each have a resistance of 50 ohms. The resistors R1, R2 may have other resistance values in other embodiments.

In some embodiments, the termination circuitry 638 may be configured such that the data signals 533 (e.g., PCIe, QPI, Infiniband, etc.) can be tunneled through a same optical transceiver corresponding with the laser driver 616 (e.g., tunneled through a laser driver 616 and receiver 518 of FIG. 5 corresponding to a same channel such as the first channel 541). In a case where a protocol (e.g., PCIe, QPI, Infiniband, etc.) is directly driving the optical transceiver corresponding with the laser driver 616, the termination resistance (e.g., resistors R1, R2) may be connected or disconnected from the DC common-mode node or AC ground in order for the protocol of the switch/router (e.g., switch/router 104 of FIG. 1) to detect if the individual link (e.g., one of the individual links 441, 442, 443, 444 of FIG. 5) corresponding to the laser driver 616 is present or not present, respectively.

During a link handshake process, switches of the termination circuitry 638 may be set to an off state (e.g., by termination control signal Term_ctl) to indicate to a driver of the protocol (e.g., PCIe) that the optical link (e.g., optical link 526) may not be ready for transmission of optical signals. After the link handshake process is performed and the optical link is in an active state, the switches may be set to an on state to indicate to the driver of the protocol that the optical link is present and ready for data transmission.

Figure 7:
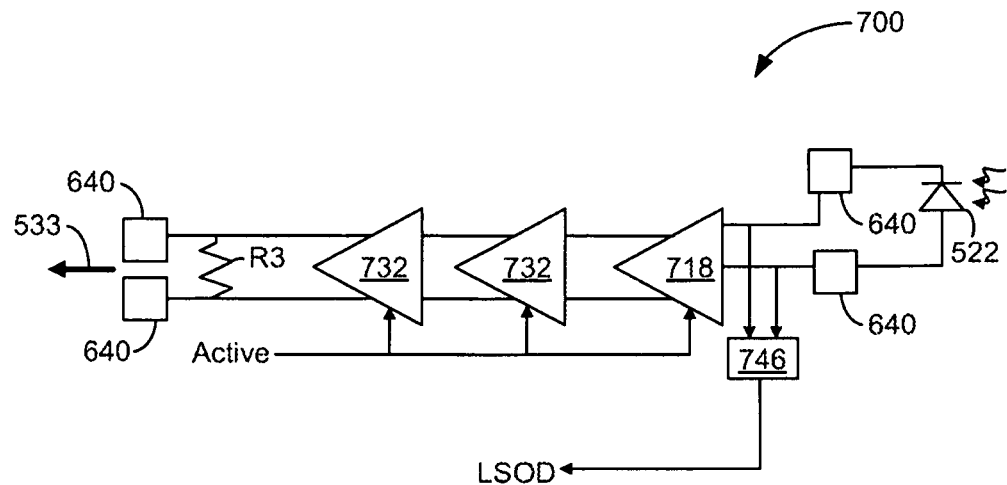
FIG. 7 schematically illustrates an example receiver configuration, in accordance with some embodiments.

FIG. 7 schematically illustrates an example receiver configuration 700, in accordance with some embodiments. In some embodiments, the receiver configuration 700 may represent a receiver of the receivers 518 of FIG. 5.

A photodetector 522 may be coupled with a transimpedance amplifier (TIA) 718 of the receiver configuration 700. The photodetector 522 may comport with embodiments described in connection with the photodetector 522 of FIG. 5. In some embodiments, the photodetector 522 may be electrically coupled with the TIA 718 via one or more interconnect structures 640, which may represent, for example, bonding pads, solder bumps, or other interconnect structures that may be used to couple a die to another die or a substrate. In some embodiments, the photodetector 522 may be disposed on a die that is different than a die that includes the TIA 718.

Gain stage(s) 732 may be coupled with the laser driver TIA 718, as can be seen. The gain stage(s) 732 may be configured to receive an Active signal sent by an LHSM (e.g., LHSM 177 of FIG. 5). The Active signal may indicate that an optical link (e.g., the optical link 526 of FIG. 5) is in an active state for data transmission. The receiver configuration 700 may include more or fewer gain stage(s) 732 than depicted in other embodiments. A signal detector 746 may be coupled with the photodetector 522 and an input to the TIA 718, as can be seen. The signal detector 746 may be configured to assert a Low Speed Optical Detect (LSOD) signal when an optical signal is present or detected at the photodetector 522.

Termination circuitry including a resistor R3 may be coupled with the gain stage(s) 732. In some embodiments, the resistor R3 may have a resistance of 100 ohms. The resistor R3 may have other resistance values in other embodiments. According to various embodiments, the termination circuitry (e.g., resistor R3), gain stage(s) 732, signal detector 746, and the TIA 718 may be embodied on a same die as the LHSM. The receiver of the receiver configuration 700 may be configured to output the data signals 533 based on optical signals received at the photodetector 522.

Figure 8:
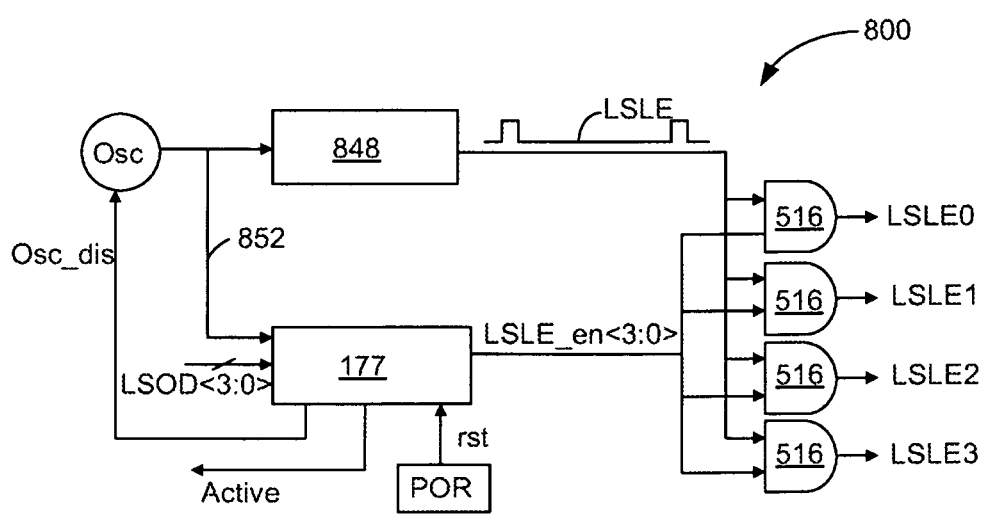
FIG. 8 schematically illustrates an example link handshake state machine configuration, in accordance with some embodiments.

FIG. 8 schematically illustrates an example link handshake state machine (LHSM) configuration 800, in accordance with some embodiments. The LHSM configuration 800 may represent on-chip logic in some embodiments. Features of the LHSM configuration 800 may be embodied on a same die. In some embodiments, circuitry of the LHSM configuration 800 may be formed on a die that is different from another die upon which a switch/router (e.g., switch/router 104 of FIG. 1) is formed.

The LHSM configuration 800 includes an on-chip oscillator (Osc) coupled with an LHSM 177, as can be seen. The signal Osc_dis may be configured to disable the oscillator. For example, when Osc_dis is set to a first value (e.g., Osc_dis='1'), the Osc may be disabled or muted to avoid coupling of noise into other circuits during the active state. When the Osc_dis is set to a second value (e.g., Osc_dis='0'), the Osc may be activated or on. The on-chip oscillator may be configured to generate a clock frequency. The Osc may be coupled with the LHSM 177 via line 852 to feed the clock frequency to the LHSM 177 so that the LHSM 177 is synchronized with the clock frequency. In some embodiments, the clock frequency may be 4 kilohertz (kHz). The clock frequency may be set to other frequencies in other embodiments.

A connect-pulse generator 848 may be coupled with the on-chip oscillator to generate an electrical connect pulse source signal (e.g., LSLE signal) based on the clock frequency. Laser drivers 516 may be configured to receive the LSLE signal and generate a corresponding optical connect pulse (e.g., LSLE0, LSLE1, LSLE2, LSLE3) for each channel of an optical module based on the LSLE signal. The laser drivers 516 may be allowed to receive the LSLE signal based on an LSLE enable signal (e.g., LSLE_en<3:0>) sent by the LHSM 177 in some embodiments. For example, if the LSLE enable signal is "high" for a laser driver of the laser drivers 516, then the laser driver can receive the LSLE signal and generate the corresponding optical connect pulse. If the LSLE enable signal is "low" for the laser driver, then the laser driver may not receive the LSLE signal and may not generate a corresponding optical connect pulse.

The LSLE signal may be a low duty-cycle, low-speed pulse to allow the corresponding optical connect pulse generated by the laser drivers 516 to meet eye safety standards such as a Class 1 safety standard (e.g., when the optical cable providing the optical link is unplugged). The LHSM configuration may allow achievement of a Class 1 safety standard for an optical module (e.g., optical module 106 of FIGS. 1-5) owing to the pulsing scheme being at the optical transceiver level. In some embodiments, the LHSM 177 is configured to monitor for an event (e.g., disconnection of an optical cable associated with the optical link) that indicates a laser safety hazard and prevent a laser(s) (e.g., laser 520 of FIGS. 5-6) from transmitting with a pre-configured time of detection of the event. In some embodiments, the LHSM 177 may be configured to automatically shut off the laser(s) within 1 millisecond (ms) upon detection of disconnection of the optical cable.

The LHSM 177 may be configured to generate an Active signal to indicate that the optical link associated with the laser drivers 516 is ready for data transmission (e.g., link handshake process is successfully completed). The LHSM 177 may be configured to monitor a reset signal (e.g., rst) from a power-on-reset (POR) block. The POR block may be configured to generate or otherwise provide the reset signal to the LHSM. When the LHSM receives the reset signal, the LHSM 177 may enter a standby state to indicate that the optical link is not ready for data transmission and/or that the optical link is to be tested by the link handshake process. The LHSM 177 may be further configured to monitor LSOD signals (e.g., LSOD<3:0>) during an active state of the optical link. If the LSOD signals indicate that the optical link has been broken (e.g., optical cable disconnected or far-end optical module is disabled), then the LHSM 177 may be configured to enter the standby state. The LHSM 177 may be a link handshake engine that is configured to perform actions described in connection with FIGS. 9-10.

Figure 9:
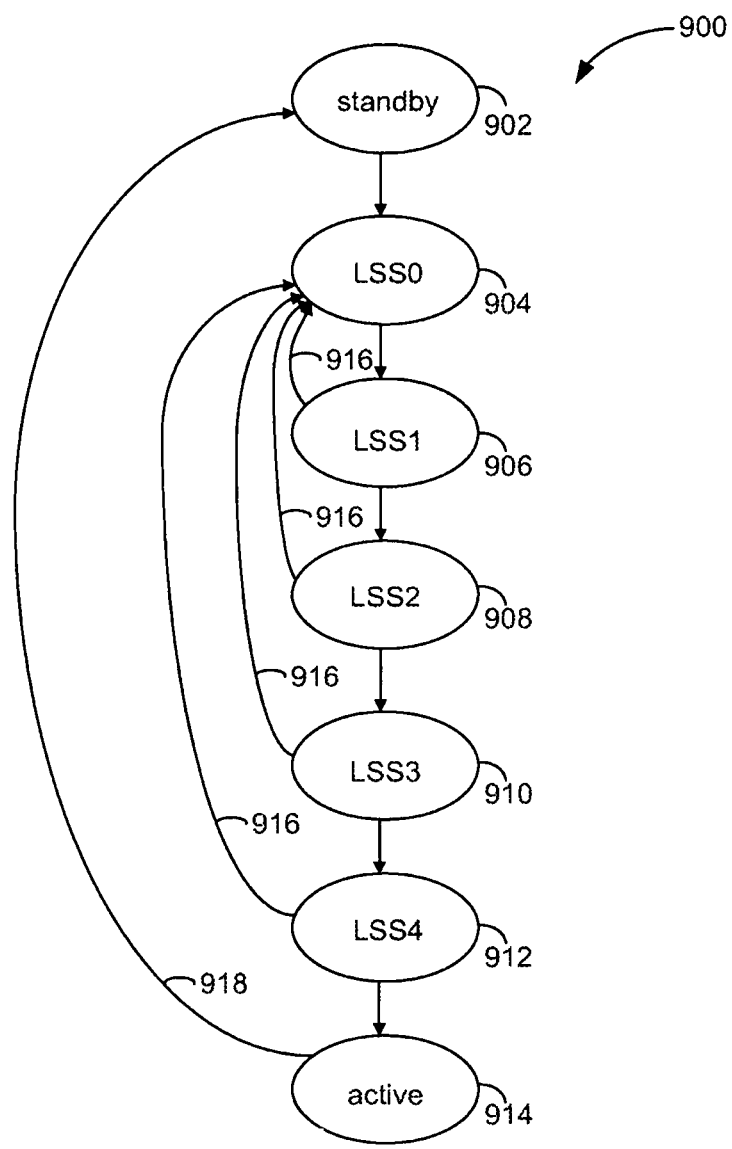
FIG. 9 schematically illustrates an example optical link handshake scheme, in accordance with some embodiments.

FIG. 9 schematically illustrates an example optical link handshake scheme 900, in accordance with some embodiments. According to various embodiments, the optical link handshake scheme 900 may be controlled by an LHSM (e.g., LHSM 177 of FIG. 1) that is part of an optical module (e.g., optical module 106 of FIG. 1). In some embodiments, the link handshake scheme 900 may not be controlled by features of a switch/router (e.g., switch/router 104 of FIG. 1), except where otherwise indicated.

In response to power up of a processor-based system (e.g., first or second processor-based system 125 or 150 of FIG. 1) or power up of an optical module 106 of the processor-based system, the LHSM and/or an optical link (e.g., optical link 526 of FIG. 5) of the processor-based system may enter, at 902, a standby state based on a reset signal received by the LHSM. In response to the reset signal, the LHSM may set an Active signal (e.g., Active signal of FIGS. 6-8) equal to a value (e.g., active='0') to disable data pathways (e.g., high-speed data pathways) for each channel of the optical module. The standby state may indicate that the optical link is not active or enabled for data transmission. All channels of the optical module may be powered down in the standby state. In response to receiving the reset signal, the LHSM may set an LSLE enable signal (e.g., LSLE_en<3:0> of FIG. 8) equal to a value (e.g., LSLE_en<3:0>='0000') such that none of the channels are enabled for transmitting connect pulses of a link handshake process. In the standby state, the optical module may be not enabled. For example, a system controller (e.g., processor 102 or switch/router 104 of FIG. 1) may set an enable transistor of the optical module to a value (e.g., TX_en='0') to indicate that the optical module is not enabled for operation.

In response to the system controller enabling the optical module (e.g., TX_en='1'), the LHSM may enter, at 904, Link handShake State 0 (LSS0), which may be a first link handshake state to begin the link handshake process. In response to entering the LSS0, the LHSM may enable only a laser driver of a first channel (e.g., Ch0) to generate connect pulses (e.g., by setting the LSLE_en<3:0>='0001') for transmission to a far-end optical module over the optical link. In response to entering the LSS0, the LHSM may further monitor a signal detector of the first channel to detect connect pulses received over the optical link from a far-end optical module. The connect pulses generated by the laser driver or received by the signal detector may include three pulses in some embodiments. More or fewer connect pulses can be used in other embodiments.

In the LSS0, the LHSM may receive a link detect signal having a value (e.g., LD<3:0>='0000') to indicate that none of the individual links of the optical link corresponding to channels of the optical module have been detected. If no connect pulses are detected by the signal detector corresponding to the first channel (e.g., the optical cable is disconnected or the far-end optical module is disabled), the LHSM may remain in the LSS0 state indefinitely. In response to the signal detector detecting the connect pulses from the far-end optical module, the link detect signal may have a value (e.g., LD<3: 0>='0001') to indicate that an individual link is successfully detected for the first channel.

In response to the link detect signal being set to a value that indicates that the individual link is successfully detected for the first channel (e.g., LD<3:0>='0001'), the LHSM may enter, at 906, Link handShake State 1 (LSS1). In response to entering the LSS1, the LHSM may enable a laser driver of a second channel (e.g., Ch1) of the optical module to generate connect pulses (e.g., by setting the LSLE_en<3:0>='0011'). In response to entering the LSS1, the LHSM may further monitor a signal detector of the second channel to detect connect pulses received over the optical link from a far-end optical module. In response to the signal detector of the second channel detecting the connect pulses from the far-end optical module, the LHSM may set the link detect signal to a value (e.g., LD<3:0>='0011') to indicate that an individual link is successfully detected for the second channel.

In response to the link detect signal being set to a value that indicates that the individual link is successfully detected for the second channel (e.g., LD<3:0>='0011'), the LHSM may enter, at 908 Link handShake State 1 (LSS1). Similar operations may be performed at 908 and 910 as described in connection with 906 until all channels (or designated channels) of the optical module have been tested. In the optical link handshake scheme 900 of FIG. 9, four channels are tested by the link handshake process. More or fewer channels can be tested according to principles described herein in other embodiments. The far-end optical module may be configured with another LHSM that is performing the same link handshake process from the far-end to generate connect pulses and monitor to detect connect pulses over the individual links for each of the channels.

In response to the link detect signal being set to a value (e.g., LD<3:0>='1111') that indicates that the individual link is successfully detected for the fourth channel (or a final channel to be tested), the LHSM may enter, at 912, a final Link handShake State 4 (LSS4). The Active signal may have a value that indicates deactivation (e.g., active='0') of the data pathways during a time from the standby state at 902 to the LSS3 state at 904. In response to entering the LSS4, the LHSM may set the Active signal to a value (e.g., active='1') to activate or enable data pathways (e.g., high-speed data pathways) for the channels of the optical link. In response to entering LSS4, the LHSM may further set the LSLE enable signal (e.g., LSLE_en<3:0> of FIG. 8) equal to a value (e.g., LSLE_en<3:0>='0000') such that none of the channels are enabled for transmitting connect pulses of the link handshake process. If the optical cable is disconnected during states LSS1-LSS4 or no connect pulse from the far-end optical module is otherwise detected (e.g., LD<3:0>='0000') during states LSS1-LSS4, the LHSM will return, at 916, to the LSS0 and begin the link handshake process again.

Subsequent to activating the data pathways for the channels and disabling the connect pulses for the channels, the LHSM may wait for a period of time to provide a delay to ensure that the far-end module has also activated the data pathways for the channels. The delay may be configured to account for clock frequency differences that may exist between the optical module and the far-end optical module. In some embodiments, the delay may be about 500 micro-seconds. The delay may include other periods of time in other embodiments.

In response to the data pathways being activated, the LSOD signals for each signal detector may have a value (e.g., LSOD<3:0>='1111') that indicates that optical signals are being received at all channels of the optical module. Subsequent to activation of the data pathways, the laser drivers for the channels of the optical module and the far-end optical module may send average optical power.

The LHSM may wait for a pre-configured amount of time (e.g., 500 micro-seconds) after the LSOD signals have indicated that optical signals are being received at all channels and then set the optical link to an active state, at 914, to indicate that the optical link is ready for sending or receiving data signals. In the active state, the LHSM may monitor the LSOD signals and/or a reset signal. If the LSOD signals have a value that indicates that a cable is disconnected or that the far-end optical module is disabled (e.g., one of the LSOD signals for one of the signal detectors is "low") or the reset signal indicates a reset; the LHSM may return, at 918, to the standby state. In the active state, the LHSM may set an Osc_dis signal to a value to disable an on-chip oscillator. For example, when Osc_dis is set to a first value (e.g., Osc_dis='1'), the Osc may be disabled or muted to avoid coupling of noise into other circuits during the active state.

The optical link handshake scheme 900 may have only two states (e.g., standby and active) or three states (e.g., standby, active, and off) in some embodiments. The reduced number of states relative to other link handshake schemes may facilitate implementation of the optical link handshake scheme 900 in server applications relative to other link handshake schemes that use a greater number of states.

Figure 10:
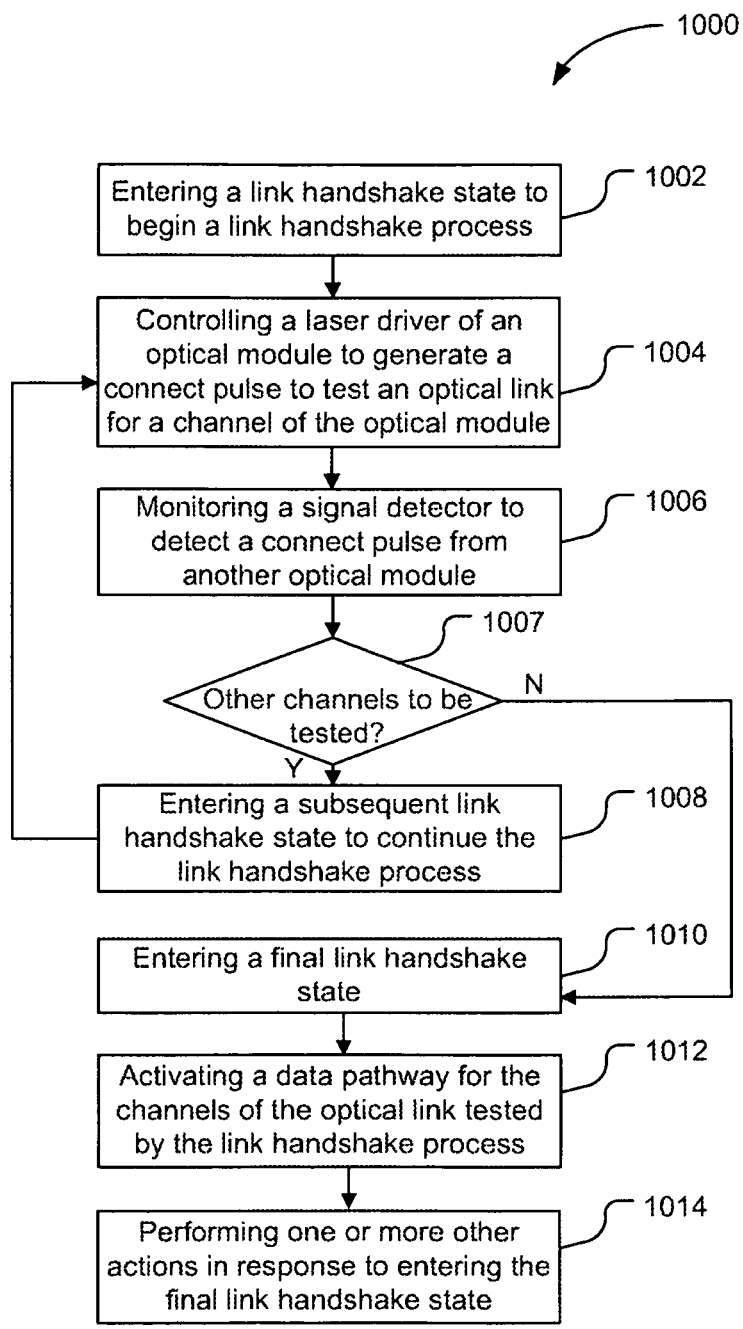
FIG. 10 is a flow diagram for a method of performing a link handshake process, in accordance with some embodiments.

FIG. 10 is a flow diagram for a method 1000 of performing a link handshake process, in accordance with some embodiments. The method 1000 may comport with actions described in connection with FIGS. 1-9 in various embodiments. The actions of method 1000 may be performed by an LHSM (e.g., LHSM 177 of first optical module 106a of FIG. 5), unless otherwise indicated.

At 1002, the method 1000 includes entering a link handshake state (e.g., LSS0 of FIG. 9) to begin a link handshake process. In some embodiments, the LHSM may enter the link handshake state in response to a signal that enables operation of an optical module (e.g., first optical module 106a of FIG. 5) that includes the LHSM (e.g., a system controller enabling the optical module by setting TX_en='1'). Prior to entering the link handshake state, the LHSM may be in a standby state that is set in response to powering up of the optical module.

At 1004, the method 1000 may further include controlling a laser driver (e.g., laser driver 516 of FIG. 5) of the optical module to generate a connect pulse to test an optical link (e.g., optical link 526 of FIG. 5) for a channel (e.g., first channel 541 of FIG. 5) of the optical module. The connect pulse may be generated to test the optical link between the channel of the optical module and a corresponding channel (e.g., first channel 541 of FIG. 5) of a far-end optical module (e.g., second optical module 106b of FIG. 5). The LHSM may be configured to control the laser driver to generate the connect pulse in response to the LHSM entering the link handshake state at 1002.

At 1006, the method 1000 may further include monitoring a signal detector (e.g., signal detector 746 of FIG. 7, which may be part of a receiver 518 of the first optical module 106a of FIG. 5) of the optical module to detect a connect pulse from the far-end optical module. The LHSM may be configured to monitor the signal detector to detect a connect pulse received over the optical link in response to the LHSM entering the link handshake state at 1002.

At 1007, if other channels of the optical module are to be tested by the link handshake process, then, at 1008, the method 1000 may further include entering a subsequent link handshake state to continue the link handshake process. The LHSM may enter the subsequent link handshake state in response to detecting the connect pulse from the far-end optical module based on the monitoring at 1006. Actions at 1004 to 1008 may be performed for each of the other channels to be tested in a similar manner as described in connection with the first tested channel.

At 1007, if no other channels of the optical module are to be tested by the link handshake process, then, at 1010, the method 1000 may further include entering a final link handshake state (e.g., LSS4 of FIG. 9). In some embodiments, if the LHSM may be configured to return to the link handshake state to begin the link handshake process (e.g., at 1002) in response to not detecting the connect pulse being monitored at 1006 from the another optical module within a pre-configured amount of time.

At 1012, the method 1000 may further include activating a data pathway for the channels of the optical link tested by the link handshake process. The LHSM may activate the data pathway for the channels in response to the LHSM entering the final handshake state.

At 1014, the method 1000 may further include performing one or more other actions in response to entering the final link handshake state. In some embodiments, the LHSM may further set a state of the optical link to an active state subsequent to a pre-configured delay of time in response to entering the final link handshake state. In some embodiments, the LHSM may further disable connect pulses of the link handshake process for each channel of the optical module tested by the link handshake process in response to the entering the fifth link handshake state. In some embodiments, when the optical link is in an active state, the LHSM may be configured to monitor to detect LSOD signals and/or a reset signal and set a state of the optical link from an active state to a standby state based on the LSOD signals or the reset signal.

Figure 11:
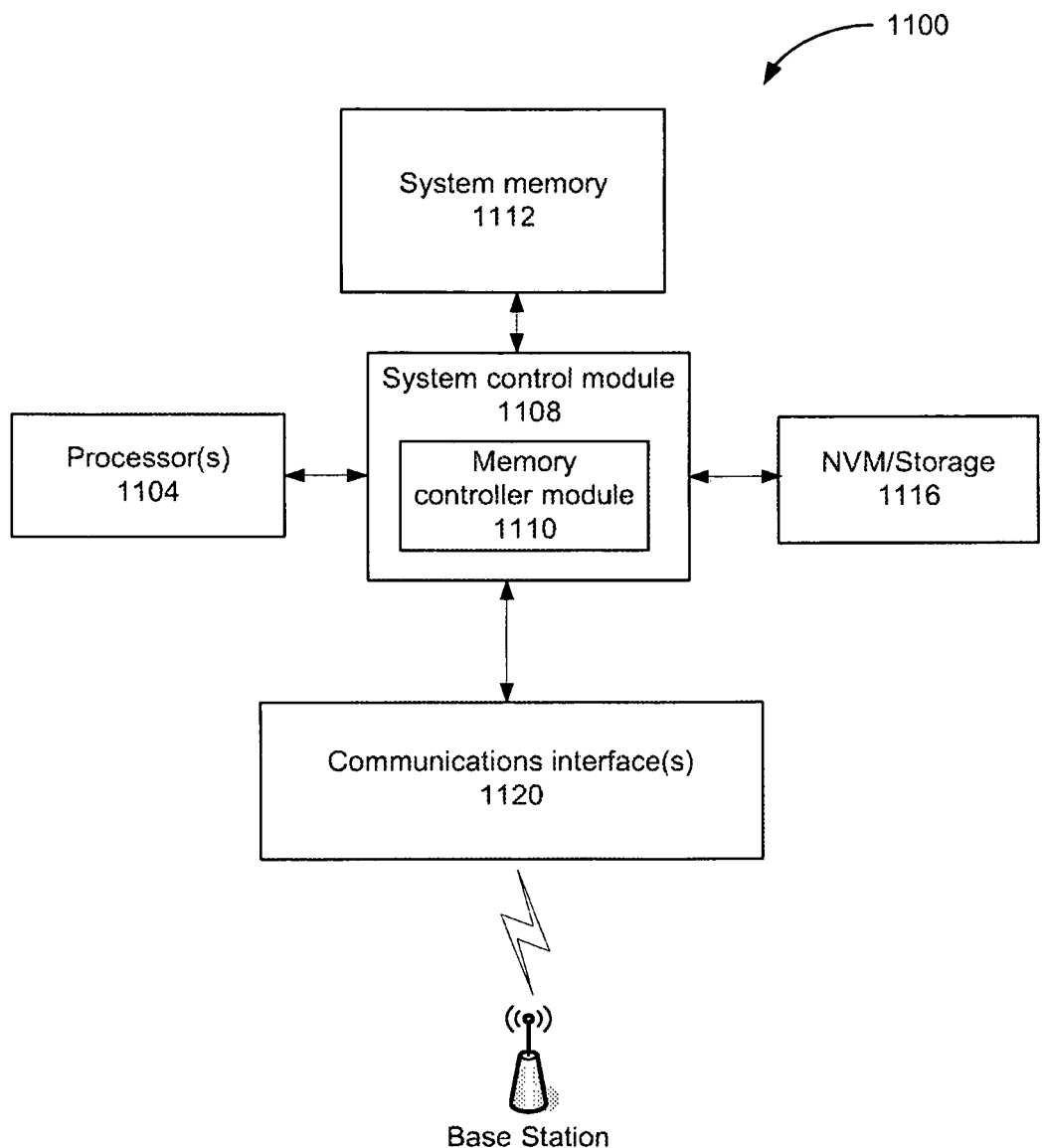
FIG. 11 schematically illustrates an example processor-based system that may be part of an optical communication system described herein, in accordance with some embodiments.

Embodiments of the present disclosure may be implemented into a system using any suitable hardware and/or software to configure as desired. FIG. 11 schematically illustrates an example processor-based system 1100 (e.g., processor-based system 125 or 150 of FIGS. 1-3) that may be part of an optical communication system (e.g., optical communication system 100, 200, 300 of respective FIGS. 1-3) described herein, in accordance with some embodiments. In one embodiment, the processor-based system 1100 includes one or more processor(s) 1104. One of the one or more processor(s) 1104 may correspond, for example, with the processor 102 of FIG. 1.

The processor-based system 1100 may further include system control module 1108 coupled to at least one of the processor(s) 1104, system memory 1112 coupled to system control module 1108, non-volatile memory (NVM)/storage 1116 coupled to system control module 1108, and one or more communications interface(s) 1120 coupled to system control module 1108.

System control module 1108 for one embodiment may include any suitable interface controllers to provide for any suitable interface to at least one of the processor(s) 1104 and/or to any suitable device or component in communication with system control module 1108.

System control module 1108 may include a memory controller module 1110 to provide an interface to system memory 1112. The memory controller module 1110 may be a hardware module, a software module, and/or a firmware module.

System memory 1112 may be used to load and store data and/or instructions, for example, for processor-based system 1100. System memory 1112 for one embodiment may include any suitable volatile memory, such as suitable Dynamic Random Access Memory (DRAM), for example.

System control module 1108 for one embodiment may include one or more input/output (I/O) controller(s) to provide an interface to NVM/storage 1116 and communications interface(s) 1120.

The NVM/storage 1116 may be used to store data and/or instructions, for example. NVM/storage 1116 may include any suitable non-volatile memory, such as Phase Change Memory (PCM) or flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 1116 may include a storage resource physically part of a device on which the processor-based system 1100 is installed or it may be accessible by, but not necessarily a part of, the device. For example, the NVM/storage 1116 may be accessed over a network via the communications interface(s) 1120.

Communications interface(s) 1120 may provide an interface for processor-based system 1100 to communicate over one or more wired or wireless network(s) and/or with any other suitable device. For example, in some embodiments, the communication interface(s) 1120 may be configured to communicate wirelessly over a wireless link established with a base station of a wireless communication network (e.g., radio access network (RAN) and/or core network). The communication interface(s) 1120 may be configured with a transmitter, receiver, or transceiver to wirelessly transmit/receive signals according to various communication protocols including, for example, broadband wireless access (BWA) networks including networks operating in conformance with one or more protocols specified by the 3$^{rd}$ Generation Partnership Project (3GPP) and its derivatives, the WiMAX Forum, the Institute for Electrical and Electronic Engineers (IEEE) 802.16 standards (e.g., IEEE 802.16-2005 Amendment), long-term evolution (LTE) project along with any amendments, updates, and/or revisions (e.g., advanced LTE project, ultra mobile broadband (UMB) project (also referred to as "3GPP2"), etc.). The communication interface(s) 1120 may be configured to communicate using additional/alternative communication standards, specifications, and/or protocols. For example, the communication interface(s) 1120 may be configured to communicate with wireless local area networks (WLANs), wireless personal area networks (WPANs) and/or wireless wide area networks (WWANs) such as cellular networks (e.g., 2 G, 3 G, 4 G, 5 G, etc.) and the like. The communication interface(s) 1120 may be configured to communicate according to technologies such as Evolution-Data Optimized (Ev-DO), Evolved High-Speed Packet Access (HSPA+), High-Speed Download Packet Access (HSDPA+), High-Speed Uplink Packet Access (HSUPA), Global System for Mobile communications (GSM), Enhanced Data GSM Environment (EDGE), General Packet Radio Service (GPRS), Code Division Multiple Access (CDMA), Time Division Multiple Access (TDMA), Digital Enhanced Cordless Telecommunications (DECT), Bluetooth, or derivatives thereof. The processor-based system 1100 may include a plurality of communication chips (e.g., processor(s) 1104). For instance, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others.

For one embodiment, at least one of the processor(s) 1104 may be packaged together with logic for one or more controller(s) of system control module 1108, e.g., memory controller module 1110. For one embodiment, at least one of the processor(s) 1104 may be packaged together with logic for one or more controllers of system control module 1108 to form a System in Package (SiP). For one embodiment, at least one of the processor(s) 1104 may be integrated on the same die with logic for one or more controller(s) of system control module 1108. For one embodiment, at least one of the processor(s) 1104 may be integrated on the same die with logic for one or more controller(s) of system control module 1108 to form a System on Chip (SoC).

In various embodiments, the processor-based system 1100 may be, but is not limited to, a server, a workstation, a desktop computing device, or a mobile computing device (e.g., a laptop computing device, a handheld computing device, a handset, a tablet, a smartphone, a netbook, ultrabook, etc.). In various embodiments, the processor-based system 1100 may have more or less components, and/or different architectures. For example, in some embodiments, the processor-based system 1100 may include one or more of a camera, a keyboard, display such as a liquid crystal display (LCD) screen (including touch screen displays), a touchscreen controller, non-volatile memory port, antenna or multiple antennas, graphics chip, ASIC, speaker(s), a battery, an audio codec, a video codec, a power amplifier, a global positioning system (GPS) device, a compass, an accelerometer, a gyroscope, and the like. In various embodiments, the processor-based system 1100 may have more or less components, and/or different architectures.

According to various embodiments, the present disclosure describes an optical module comprising a laser driver corresponding with a channel of the optical module, a signal detector corresponding with the channel, and a link handshake state machine configured to control the laser driver to generate a connect pulse of a link handshake process to test an optical link between the channel and a corresponding channel of another optical module and monitor the signal detector to detect a connect pulse from the another optical module. In some embodiments, the link handshake state machine is further configured to enter a link handshake state to begin the link handshake process and the link handshake state machine is further configured to control the laser driver to generate the connect pulse and to monitor the signal detector to detect the connect pulse, in response to the link handshake state.

In some embodiments, the link handshake state is a first link handshake state and the link handshake state machine is further configured to detect the connect pulse from the another optical module and enter a second link handshake state in response to detection of the connect pulse from the another optical module. In some embodiments, the channel is a first channel of a plurality of channels of the optical module, the corresponding channel of the another optical module is a corresponding first channel, the laser driver is a first laser driver corresponding with the first channel, the connect pulse generated by the first laser driver and the connect pulse from the another module are first connect pulses, the signal detector is a first signal detector.

The optical module may further include a second channel a second laser driver corresponding with the second channel and a second signal detector corresponding with the second channel, wherein the link handshake state machine is further configured to control the second laser driver to generate a second connect pulse of the link handshake process to test an optical link between the second channel and a corresponding second channel of the another optical module and monitor the second signal detector to detect a second connect pulse from the another optical module, the link handshake state machine being configured to control the second laser driver to generate the second connect pulse and to monitor to detect the second connect pulse in response to the second link handshake state. In some embodiments, the link handshake state machine is further configured to return to the first link handshake state in response to no detection of the second connect pulse from the another optical module within a pre-configured amount of time and the link handshake state machine is further configured to control the first laser driver to generate another first connect pulse to test the optical link between the first channel and the corresponding first channel of the another optical module in response to the return to the first link handshake state.

In some embodiments, the optical module may further include one or more additional channels, one or more additional laser drivers corresponding with the one or more additional channels, and one or more additional signal detectors corresponding with the one or more additional channels, wherein the link handshake state machine is further configured to control the one or more additional laser drivers to generate one or more additional connect pulses of the link handshake process to test an optical link between the one or more additional channels and one or more corresponding additional channels of the another optical module. In some embodiments, the link handshake state machine is further configured to monitor the one or more additional signal detectors to detect one or more additional connect pulses from the another optical module. In some embodiments, the link handshake state machine is further configured to perform actions to control the one or more additional lasers and to monitor the one or more additional signal detectors until each channel of the plurality of channels of the optical module is tested by the link handshake process.

In some embodiments, the link handshake state machine is further configured to enter a final link handshake state and activate a data pathway to the optical link for each channel of the plurality of channels in response to detection of a connect pulse from the another module for a last channel of the plurality of channels tested using the link handshake process. In some embodiments, the link handshake state machine is further configured to set a state of the optical link to an active state in response to the entering the final link handshake state. In some embodiments, the link handshake state machine is further configured to monitor for an event that indicates disconnection of a cable associated with the optical link and to prevent a laser driven by the laser driver from transmitting within a pre-configured time of detection of the event.

In some embodiments, circuitry for the link handshake state machine is formed on a die that is different from another die upon which a switch or router is formed, the switch or router being configured to send multiple protocols over a same physical layer to the optical module, multiplex the multiple protocols together in a physical layer frame, include functionality for star, tree, or daisy chain network topologies, or use native protocol software drivers to communicate with the optical module. The optical module may further include a laser coupled with the laser driver, a gain stage coupled with the laser driver, termination resistance circuitry coupled with the gain stage, and a generator coupled with the laser driver to generate bias or modulation currents for the laser. The optical module may further include a photodetector coupled with the signal detector, a transimpedance amplifier coupled with the signal detector, a gain stage coupled with the transimpedance amplifier, and termination resistance circuitry coupled with the gain stage. The optical module may further include an oscillator to generate a clock frequency, a connect-pulse generator coupled with the oscillator to provide a source signal to the laser driver for the connect pulse based on the clock frequency, and a power-on reset block coupled with the link handshake state machine to generate a reset signal when the optical module is powered up, wherein circuitry of the oscillator and the connect-pulse generator is formed on a same die as circuitry of the link handshake state machine.

According to various embodiments, the present disclosure describes a method including controlling, by a link handshake state machine of an optical module, a laser driver of the optical module to generate a connect pulse of a link handshake process to test an optical link between a channel of the optical module and a corresponding channel of another optical module and monitoring, by the link handshake state machine, a signal detector of the optical module to detect a connect pulse from the another optical module. The method may further include entering, by the link handshake state machine, a link handshake state to begin the link handshake process, wherein the controlling and the monitoring are performed in response to the link handshake state machine entering the link handshake state.

In some embodiments, entering the link handshake state is performed in response to a signal that enables operation of the optical module. In some embodiments, the link handshake state is a first link handshake state. The method may further include detecting, by the link handshake state machine, the connect pulse from the another optical module and entering, by the link handshake state machine, a second link handshake state in response to detecting the connect pulse from the another optical module. In some embodiments, the channel is a first channel of a plurality of channels of the optical module, the corresponding channel is a corresponding first channel, the laser driver is a first laser driver corresponding with the first channel, the connect pulse generated by the first laser driver and the connect pulse from the another module are first connect pulses, and the signal detector is a first signal detector. The method may further include controlling, by the link handshake state machine, a second laser driver of the optical module to generate a second connect pulse of the link handshake process to test an optical link between a second channel of the optical module and a corresponding second channel of the another optical module and monitoring, by the link handshake state machine, a second signal detector of the optical module to detect a second connect pulse from the another optical module, wherein the controlling the second laser driver and the monitoring to detect the second connect pulse are performed in response to the link handshake state machine entering the second link handshake state.

The method may further include returning, by the link handshake state machine, to the first link handshake state in response to not detecting the second connect pulse from the another optical module within a pre-configured amount of time and controlling, by the link handshake state machine, the first laser driver to generate another first connect pulse to test the optical link between the first channel and the corresponding first channel of the another optical module in response to the returning to the first link handshake state. The method may further include detecting, by the link handshake state machine, the second connect pulse from the another optical module, entering, by the link handshake state machine, a third link handshake state in response to detecting the second connect pulse, controlling, by the link handshake state machine, a third laser driver of the optical module to generate a third connect pulse of the link handshake process to test an optical link between a third channel of the optical module and a corresponding third channel of the another optical module, and monitoring, by the link handshake state machine, a third signal detector of the optical module to detect a third connect pulse from the another optical module, wherein the controlling the third laser driver and the monitoring to detect the third connect pulse are performed in response to the link handshake state machine entering the third link handshake state.

The method may further include detecting, by the link handshake state machine, the third connect pulse from the another optical module, entering, by the link handshake state machine, a fourth link handshake state in response to detecting the third connect pulse, controlling, by the link handshake state machine, a fourth laser driver of the optical module to generate a fourth connect pulse of the link handshake process to test an optical link between a fourth channel of the optical module and a corresponding fourth channel of the another optical module, and monitoring, by the link handshake state machine, a fourth signal detector of the optical module to detect a fourth connect pulse from the another optical module, wherein the controlling the fourth laser driver and the monitoring to detect the fourth connect pulse are performed in response to the link handshake state machine entering the fourth link handshake state. The method may further include controlling, by the link handshake state machine, an additional laser driver of the optical module to generate an additional connect pulse of the link handshake process to test an optical link between an additional channel of the optical module and a corresponding additional channel of the another optical module and monitoring, by the link handshake state machine, an additional signal detector of the optical module to detect an additional connect pulse from the another optical module, wherein the controlling the additional laser driver and the monitoring to detect the additional connect pulse are repeated until all channels of the optical module are tested by the link handshake process.

The method may further include, in response to detecting the fourth connect pulse from the another module, entering, by the link handshake state machine, a fifth link handshake state and activating, by the link handshake state machine, a data pathway to the optical link for each channel of the optical module tested by the link handshake process in response to the entering the fifth link handshake state. The method may further include setting, by the link handshake state machine, a state of the optical link to an active state, wherein setting the state is performed subsequent to a pre-configured delay of time and disabling, by the link handshake state machine, connect pulses of the link handshake process for each channel of the optical module tested by the link handshake process, wherein setting the state and disabling the connect pulses is performed in response to the entering the fifth link handshake state. The method may further include monitoring, by the link handshake state machine, to detect Low Speed Optical Detect (LSOD) signals and a reset signal and setting, by the link handshake state machine, a state of the optical link between the channels of the optical module and the channels of the another optical module from an active state to a standby state based on the LSOD signals or the reset signal. The method may further include setting the optical link in a standby state in response to powering up of the optical module and powering down one or more channels of the optical module including the channel, wherein setting the optical link in the standby state and powering down the one or more channels is performed prior to controlling the laser driver of the optical module to generate the connect pulse. The method may further include monitoring, by the link state machine, for an event that indicates disconnection of a cable associated with the optical link and preventing, by the link handshake state machine, a laser driven by the laser driver from transmitting within a pre-configured time of detection of the event.

According to various embodiments, the present disclosure describes an optical communication system comprising a first optical module, an optical coupler and a second optical module optically coupled with the first optical module by the optical coupler, wherein the first optical module and the second optical module each comprise a channel, a laser driver corresponding with the channel, a signal detector corresponding with the channel, and a link handshake state machine configured to control the laser driver to generate a connect pulse of a link handshake process to test an optical link of the channel between the first optical module and the second optical module and monitor the signal detector to detect a connect pulse received over the optical coupler. In some embodiments, the link handshake state machine of the first optical module and the link handshake state machine of the second optical module are further configured to enter a link handshake state to begin the link handshake process and the link handshake state machine of the first optical module and the link handshake state machine of the second optical module are further configured to control the respective laser driver to generate the connect pulse and monitor the respective signal detector to detect the connect pulse received over the optical coupler, in response to the link handshake state.

In some embodiments, the link handshake state is a first link handshake state and the link handshake state machine of the first optical module and the link handshake state machine of the second optical module are further configured to detect the connect pulse received over the optical coupler and enter one or more additional link handshake states in response to detection of the connect pulse received over the optical coupler. In some embodiments, the channel of the first optical module and the channel of the second optical module are first channels of a plurality of channels, the laser driver of the first optical module and the laser driver of the second optical module are first laser drivers, the connect pulses generated by the first laser drivers and the connect pulses received over the optical coupler are first connect pulses, the signal detector of the first optical module and the signal detector of the second optical module are first signal detectors. The first optical module and the second optical module may each further comprise one or more additional channels, one or more additional laser drivers corresponding with the one or more additional channels, and one or more additional signal detectors. In some embodiments, the link handshake state machine of the first optical module and the link handshake state machine of the second optical module are further configured to control the respective one or more additional laser drivers to generate one or more additional connect pulses of the link handshake process to test the optical link of the one or more additional channels between the first optical module and the second optical module and monitor the respective one or more additional signal detectors to detect one or more additional connect pulses received over the optical coupler, in response to the one or more additional link handshake states.

In some embodiments, the link handshake state machine of the first optical module and the link handshake state machine of the second optical module are further configured to enter a final link handshake state and activate a data pathway to the optical link for each channel of the plurality of channels in response to detection of a connect pulse received over the optical coupler for a last channel of the plurality of channels tested using the link handshake process. The optical communication system may further include a first substrate having a first processor mounted on the first substrate, the first processor being coupled with the first optical module and a second substrate having a second processor mounted on the second substrate, the second processor being coupled with the second optical module, wherein the first processor and the second processor are configured to communicate over the optical coupler. In some embodiments, the link handshake state machine of the first optical module is embodied in a first die that is mounted on the first substrate, the link handshake state machine of the second optical module is embodied in a second die that is mounted on the second substrate, and the optical coupler comprises a passive optical cable and passive optical connectors that optically couple the passive optical cable with the first optical module and the second optical module.

The optical communication system may further include a first electrical connector mounted on the first substrate and configured to receive an electrical signal from the first optical module and a second electrical connector mounted on the second substrate and configured to receive an electrical signal from the second optical module, wherein the optical coupler comprises an active optical cable that includes the first optical module at one end of the active optical cable and the second optical module at another end of the active optical cable, the first optical module being electrically coupled with the first electrical connector, and the second optical module being electrically coupled with the second electrical connector. The optical communication system may further include a switch or router mounted on the first substrate, wherein the switch or router is configured to communicate with the optical module using protocols over a same physical layer to the optical module. In some embodiments, the switch or router is embodied in a first die mounted on the first substrate, the first die being different than the first processor, the link handshake state machine of the first optical module is embodied in a second die mounted on the first substrate, the second die being different than the first die, and the protocols include encapsulated protocols that are in accordance with Peripheral Component Interconnect Express (PCIe), DisplayPort, High-Definition Multimedia Interface (HDMI), Serial Advanced Technology Attachment (SATA), Universal Serial Bus (USB), or Ethernet technologies or native protocols that are in accordance with PCIe Gen 1/2/3, QuickPath Interconnect (QPI), Thunderbolt, Infiniband, USB 3.0, HDMI, SATA, or Ethernet technologies.

In some embodiments, the switch or router is embodied in a die with the first processor and the protocols include native protocols that are in accordance with Peripheral Component Interconnect Express (PCIe) Gen 1/2/3, QuickPath Interconnect (QPI), Thunderbolt, Infiniband, Universal Serial Bus (USB) 3.0, HDMI, SATA, or Ethernet technologies. The optical system may further include a communication interface coupled with the first processor or the second processor to communicatively couple the optical communication system to a wireless network and the optical communication system is one of a server, a workstation, a desktop computing device, a tablet computing device, or a mobile computing device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An optical module comprising:
   a laser driver corresponding with a channel of the optical module;
   a signal detector corresponding with the channel;
   link handshake state machine configured to control the laser driver to generate a connect pulse of a link handshake process to test an optical link between the channel and a corresponding channel of another optical module and monitor the signal detector to detect a connect pulse from the another optical module;
   an oscillator to generate a clock frequency;
   a connect-pulse generator coupled with the oscillator to provide a source signal to the laser driver for the connect pulse based on the clock frequency; and
   a power-on reset block coupled with the link handshake state machine to generate a reset signal when the optical module is powered up, wherein circuitry of the oscillator and circuitry of the connect-pulse generator are formed on a same die as circuitry of the link handshake state machine.

2. The optical module of claim 1, wherein:
   the link handshake state machine is further configured to enter a link handshake state to begin the link handshake process; and
   the link handshake state machine is further configured to control the laser driver to generate the connect pulse and to monitor the signal detector to detect the connect pulse, in response to the link handshake state, wherein the link handshake state is a first link handshake state; and the link handshake state machine is further configured to detect the connect pulse from the another optical module and enter a second link handshake state in response to detection of the connect pulse from the another optical module.

3. The optical module of claim 2, wherein the channel is a first channel of a plurality of channels of the optical module, the corresponding channel of the another optical module is a corresponding first channel, the laser driver is a first laser driver corresponding with the first channel, the connect pulse generated by the first laser driver and the connect pulse from the another module are first connect pulses, the signal detector is a first signal detector, the optical module further comprising:
   a second channel;
   a second laser driver corresponding with the second channel; and
   a second signal detector corresponding with the second channel, wherein the link handshake state machine is further configured to control the second laser driver to generate a second connect pulse of the link handshake process to test an optical link between the second channel and a corresponding second channel of the another optical module and monitor the second signal detector to detect a second connect pulse from the another optical module, the link handshake state machine being configured to control the second laser driver to generate the second connect pulse and to monitor to detect the second connect pulse in response to the second link handshake state, wherein:
   the link handshake state machine is further configured to return to the first link handshake state in response to no detection of the second connect pulse from the another optical module within a pre-configured amount of time; and
   the link handshake state machine is further configured to control the first laser driver to generate another first connect pulse to test the optical link between the first channel and the corresponding first channel of the another optical module in response to the return to the first link handshake state.

4. The optical module of claim 1, further comprising:
   one or more additional channels;
   one or more additional laser drivers corresponding with the one or more additional channels; and
   one or more additional signal detectors corresponding with the one or more additional channels,
   wherein the link handshake state machine is further configured to control the one or more additional laser drivers to generate one or more additional connect pulses of the link handshake process to test an optical link between the one or more additional channels and one or more corresponding additional channels of the another optical module,
   wherein the link handshake state machine is further configured to monitor the one or more additional signal detectors to detect one or more additional connect pulses from the another optical module, and
   wherein the link handshake state machine is further configured to perform actions to control the one or more additional lasers and to monitor the one or more additional signal detectors until each channel of the plurality of channels of the optical module is tested by the link handshake process.

5. The optical module of claim 4, wherein the link handshake state machine is further configured to enter a final link handshake state and activate a data pathway to the optical link for each channel of the plurality of channels in response to detection of a connect pulse from the another module for a last channel of the plurality of channels tested using the link handshake process, wherein the link handshake state machine is further configured to set a state of the optical link to an active state in response to the entering the final link handshake state.

6. The optical module of claim 1, wherein the link handshake state machine is further configured to monitor for an event that indicates disconnection of a cable associated with the optical link and to prevent a laser driven by the laser driver from transmitting within a pre-configured time of detection of the event.

7. The optical module of claim 1, wherein circuitry for the link handshake state machine is formed on a die that is different from another die upon which a switch or router is formed, the switch or router being configured to send multiple protocols over a same physical layer to the optical module, multiplex the multiple protocols together in a physical layer frame, include functionality for star, tree, or daisy chain network topologies, or use native protocol software drivers to communicate with the optical module.

8. The optical module of claim 1, further comprising:
a laser coupled with the laser driver;
a gain stage coupled with the laser driver;
termination resistance circuitry coupled with the gain stage; and
a generator coupled with the laser driver to generate bias or modulation currents for the laser.

9. The optical module of claim 1, further comprising:
a photodetector coupled with the signal detector;
a transimpedance amplifier coupled with the signal detector;
a gain stage coupled with the transimpedance amplifier; and
termination resistance circuitry coupled with the gain stage.

10. A method comprising:
controlling, by a link handshake state machine of an optical module, a first laser driver of the optical module to generate a first connect pulse of a link handshake process to test an optical link between a first channel of the optical module and a corresponding first channel of another optical module; and
monitoring, by the link handshake state machine, a first signal detector of the optical module to detect a first connect pulse from the another optical module;
controlling, by the link handshake state machine, a second laser driver of the optical module to generate a second connect pulse of the link handshake process to test an optical link between a second channel of the optical module and a corresponding second channel of the another optical module; and
monitoring, by the link handshake state machine, a second signal detector of the optical module to detect a second connect pulse from the another optical module.

11. The method of claim 10, further comprising:
entering, by the link handshake state machine, a first link handshake state to begin the link handshake process, wherein the controlling and the monitoring are performed in response to the link handshake state machine entering the first link handshake state, wherein the entering the first link handshake state is performed in response to a signal that enables operation of the optical module, the method further comprising:
detecting, by the link handshake state machine, the first connect pulse from the another optical module; and
entering, by the link handshake state machine, a second link handshake state in response to detecting the first connect pulse from the another optical module wherein the controlling the second laser driver and the monitoring to detect the second connect pulse are performed in response to the link handshake state machine entering the second link handshake state.

12. The method of claim 10, further comprising:
returning, by the link handshake state machine, to the first link handshake state in response to not detecting the second connect pulse from the another optical module within a pre-configured amount of time; and
controlling, by the link handshake state machine, the first laser driver to generate another first connect pulse to test the optical link between the first channel and the corresponding first channel of the another optical module in response to the returning to the first link handshake state.

13. The method of claim 10, further comprising:
detecting, by the link handshake state machine, the second connect pulse from the another optical module;
entering, by the link handshake state machine, a third link handshake state in response to detecting the second connect pulse;
controlling, by the link handshake state machine, a third laser driver of the optical module to generate a third connect pulse of the link handshake process to test an optical link between a third channel of the optical module and a corresponding third channel of the another optical module; and
monitoring, by the link handshake state machine, a third signal detector of the optical module to detect a third connect pulse from the another optical module, wherein the controlling the third laser driver and the monitoring to detect the third connect pulse are performed in response to the link handshake state machine entering the third link handshake state.

14. The method of claim 13, further comprising:
detecting, by the link handshake state machine, the third connect pulse from the another optical module;
entering, by the link handshake state machine, a fourth link handshake state in response to detecting the third connect pulse;
controlling, by the link handshake state machine, a fourth laser driver of the optical module to generate a fourth connect pulse of the link handshake process to test an optical link between a fourth channel of the optical module and a corresponding fourth channel of the another optical module; and
monitoring, by the link handshake state machine, a fourth signal detector of the optical module to detect a fourth connect pulse from the another optical module, wherein the controlling the fourth laser driver and the monitoring to detect the fourth connect pulse are performed in response to the link handshake state machine entering the fourth link handshake state;
controlling, by the link handshake state machine, an additional laser driver of the optical module to generate an additional connect pulse of the link handshake process to test an optical link between an additional channel of the optical module and a corresponding additional channel of the another optical module; and
monitoring, by the link handshake state machine, an additional signal detector of the optical module to detect an additional connect pulse from the another optical module, wherein the controlling the additional laser driver and the monitoring to detect the additional connect pulse are repeated until all channels of the optical module are tested by the link handshake process.

15. The method of claim 14, further comprising, in response to detecting the fourth connect pulse from the another module:
   entering, by the link handshake state machine, a fifth link handshake state; and
   activating, by the link handshake state machine, a data pathway to the optical link for each channel of the optical module tested by the link handshake process in response to the entering the fifth link handshake state;
   setting, by the link handshake state machine, a state of the optical link to an active state, wherein setting the state is performed subsequent to a pre-configured delay of time; and
   disabling, by the link handshake state machine, connect pulses of the link handshake process for each channel of the optical module tested by the link handshake process, wherein setting the state and disabling the connect pulses is performed in response to the entering the fifth link handshake state;
   monitoring, by the link handshake state machine, to detect Low Speed Optical Detect (LSOD) signals and a reset signal; and
   setting, by the link handshake state machine, a state of the optical link between the channels of the optical module and the channels of the another optical module from an active state to a standby state based on the LSOD signals or the reset signal.

16. The method of claim 10, further comprising:
   setting the optical link in a standby state in response to powering up of the optical module; and
   powering down one or more channels of the optical module including the channel, wherein setting the optical link in the standby state and powering down the one or more channels is performed prior to controlling the first laser driver of the optical module to generate the first connect pulse.

17. The method of claim 10, further comprising:
   monitoring, by the link state machine, for an event that indicates disconnection of a cable associated with the optical link; and
   preventing, by the link handshake state machine, a laser driven by the first laser driver from transmitting within a pre-configured time of detection of the event.

18. An optical communication system comprising:
   a first optical module;
   an optical coupler; and
   a second optical module optically coupled with the first optical module by the optical coupler, wherein the first optical module and the second optical module each comprise:
      a channel;
      a laser driver corresponding with the channel;
      a signal detector corresponding with the channel;
      a link handshake state machine configured to control the laser driver to generate a connect pulse of a link handshake process to test an optical link of the channel between the first optical module and the second optical module and monitor the signal detector to detect a connect pulse received over the optical coupler;
      all oscillator to generate a clock frequency;
      a connect-pulse generator coupled with the oscillator to provide a source signal to the laser driver for the connect pulse based on the clock free frequency; and
      a power-on reset block coupled with the link handshake state machine to generate a reset signal when an optical module is powered up, wherein circuitry of the oscillator and circuitry of the connect-pulse generator are formed on a same die as circuitry of the link handshake state machine.

19. The optical communication system of claim 18, wherein:
   the link handshake state machine of the first optical module and the link handshake state machine of the second optical module are further configured to enter a link handshake state to begin the link handshake process; and
   the link handshake state machine of the first optical module and the link handshake state machine of the second optical module are further configured to control the respective laser driver to generate the connect pulse and monitor the respective signal detector to detect the connect pulse received over the optical coupler, in response to the link handshake state wherein:
   the link handshake state is a first link handshake state; and
   the link handshake state machine of the first optical module and the link handshake state machine of the second optical module are further configured to detect the connect pulse received over the optical coupler and enter one or more additional link handshake states in response to detection of the connect pulse received over the optical coupler.

20. The optical communication system of claim 18, wherein the channel of the first optical module and the channel of the second optical module are first channels of a plurality of channels, the laser driver of the first optical module and the laser driver of the second optical module are first laser drivers, the connect pulses generated by the first laser drivers and the connect pulses received over the optical coupler are first connect pulses, the signal detector of the first optical module and the signal detector of the second optical module are first signal detectors, the first optical module and the second optical module each further comprising:
   one or more additional channels;
   one or more additional laser drivers corresponding with the one or more additional channels; and
   one or more additional signal detectors, wherein the link handshake state machine of the first optical module and the link handshake state machine of the second optical module are further configured to control the respective one or more additional laser drivers to generate one or more additional connect pulses of the link handshake process to test the optical link of the one or more additional channels between the first optical module and the second optical module and monitor the respective one or more additional signal detectors to detect one or more additional connect pulses received over the optical coupler, in response to the one or more additional link handshake states, wherein the link handshake state machine of the first optical module and the link handshake state machine of the second optical module are further configured to enter a final link handshake state and activate a data pathway to the optical link for each channel of the plurality of channels in response to detection of a connect pulse received over the optical coupler for a last channel of the plurality of channels tested using the link handshake process.

21. The optical communication system of claim 18, further comprising:
   a first substrate having a first processor mounted on the first substrate, the first processor being coupled with the first optical module;
   a second substrate having a second processor mounted on the second substrate, the second processor being coupled with the second optical module, wherein the first processor and the second processor are configured to communicate over the optical coupler wherein:
the link handshake state machine of the first optical module is embodied in a first die that is mounted on the first substrate;
the link handshake state machine of the second optical module is embodied in a second die that is mounted on the second substrate;
the optical coupler comprises a passive optical cable and passive optical connectors that optically couple the passive optical cable with the first optical module and the second optical module;
a first electrical connector mounted on the first substrate and configure to receive an electrical signal from the first optical module;
a second electrical connector mounted on the second substrate and configured to receive an electrical signal from the second optical module, wherein the optical coupler comprises an active optical cable that includes the first optical module at one end of the active optical cable and the second optical module at another end of the active optical cable, the first optical module being electrically coupled with the first electrical connector, and the second optical module being electrically coupled with the second electrical connector;
a switch or router mounted on the first substrate, wherein the switch or router is configured to communicate with the optical module using protocols over a same physical layer to the optical module; and
a communication interface coupled with the first processor or the second processor to communicatively couple the optical communication system to a wireless network;
wherein the optical communication system is one of a server, a workstation, a desktop computing device, a tablet computing device, or a mobile computing device.

22. The optical communication system of claim 21, wherein:
the switch or router is embodied in a first die mounted on the first substrate, the first die being different than the first processor;
the link handshake state machine of the first optical module is embodied in a second die mounted on the first substrate, the second die being different than the first die; and
the protocols include encapsulated protocols that are in accordance with Peripheral Component Interconnect Express (PCIe), DisplayPort, High-Definition Multimedia Interface (HDMI), Serial Advanced Technology Attachment (SATA), Universal Serial Bus (USB), or Ethernet technologies or native protocols that are in accordance with PCIe Gen 1/2/3, QuickPath Interconnect (QPI), Thunderbolt, Infiniband, USB HDMI, SATA, or Ethernet technologies.

23. The optical communication system of claim 21, wherein:
the switch or router is embodied in a die with the first processor; and
the protocols include native protocols that are in accordance with Peripheral Component Interconnect Express (PCIe) Gen 1/2/3, QuickPath Interconnect (QPI), Thunderbolt, Infiniband, Universal Serial Bus (USB) 3.0, HDMI, SATA, or Ethernet technologies.

* * * * *